(12) United States Patent
Müller

(10) Patent No.: US 7,360,450 B2
(45) Date of Patent: Apr. 22, 2008

(54) FLOWMETER

(75) Inventor: Fritz Müller, Ingelfingen (DE)

(73) Assignee: GEMÜ Gebrüder Müller Apparatebau GmbH & Co. KG, Ingelfingen (DE)

( * ) Notice: Subject to any disclaimer, the term of this patent is extended or adjusted under 35 U.S.C. 154(b) by 0 days.

(21) Appl. No.: 11/469,090

(22) Filed: Aug. 31, 2006

(65) Prior Publication Data

US 2007/0062305 A1    Mar. 22, 2007

(30) Foreign Application Priority Data

Aug. 31, 2005    (DE) ...................... 10 2005 041 288

(51) Int. Cl.
*G01F 1/66*    (2006.01)

(52) U.S. Cl. .................................. 73/861.28

(58) Field of Classification Search ............. 73/861.25, 73/861.23, 861.27, 861.28, 861.44
See application file for complete search history.

(56) References Cited

U.S. PATENT DOCUMENTS

| | | | | |
|---|---|---|---|---|
| 5,663,509 A | * | 9/1997 | Lew et al. ............. | 73/861.357 |
| 6,158,289 A | * | 12/2000 | Taylor et al. ............ | 73/861.27 |
| 6,263,731 B1 | * | 7/2001 | Getman et al. ........... | 73/290 V |
| 6,883,386 B2 | * | 4/2005 | Osone et al. ............ | 73/861.25 |

* cited by examiner

*Primary Examiner*—Jewel Thompson
(74) *Attorney, Agent, or Firm*—Henry M. Feiereisen; Ursula B. Day

(57) ABSTRACT

A flowmeter for measuring a flow velocity of a fluid in a pipeline includes a measuring tube having opposite ends. Two ultrasonic transducers are disposed respectively at the opposing ends of the measuring tube, and two connection pipes are provided for attachment of the flowmeter to the pipeline and extend in axial relationship to the pipeline.

21 Claims, 4 Drawing Sheets

FLOWMETER

CROSS-REFERENCES TO RELATED APPLICATIONS

This application claims the priority of German Patent Application, Serial No. 10 2005 041 288.2, filed Aug. 31, 2005, pursuant to 35 U.S.C. 119(a)-(d), the content of which is incorporated herein by reference.

BACKGROUND OF THE INVENTION

The present invention relates to a flowmeter for measuring a flow velocity and a resultant flow rate of a fluid flowing in a pipeline.

Nothing in the following discussion of the state of the art is to be construed as an admission of prior art.

Flowmeters typically include a measuring tube and ultrasonic transducers which are constructed as transmitter/receiver units and mounted to the side of the measuring tube. Ultrasonic radiation is emitted at an angle through the fluid flowing in the measuring tube alternatingly in two directions, namely in flow direction and in opposition to the flow direction, in order to determine the flow velocity on the basis of a change in the running time of the ultrasonic radiation. To prevent unwanted reflection of ultrasonic radiation, it has been proposed to mount the ultrasonic transducers at the end surfaces of the measuring tube. This approach caused problems because it resulted in significant directional changes of the fluid flow path since the ultrasonic transducers take up the space at the end surfaces of the measuring tube. In addition, attachment of the flowmeter to the pipeline is made more difficult.

It would therefore be desirable and advantageous to provide an improved flowmeter to obviate prior art shortcomings.

SUMMARY OF THE INVENTION

According to one aspect of the present invention, a flowmeter for measuring a flow velocity of a fluid in a pipeline includes a measuring tube having opposite ends, two ultrasonic transducers disposed respectively at the opposing ends of the measuring tube, and two connection pipes provided for attachment of the flowmeter to the pipeline and extending in axial relationship to the pipeline.

The present invention resolves prior art problems by providing the flowmeter with connecting pipes that extend coaxial with the pipeline. In other words, the flowmeter can be attached to the pipeline in a straight line to the pipeline as a result of the interposition of the connecting pipes. By making the fluid flow path straight between the connecting pipes and the pipeline, any interference with the fluid flow at the interface is eliminated. As a consequence, the Kv value, which is a measure for the flow rate and defined as the volume flow in cubic meters per hour of water at a temperature between 5° to 30° C. with a pressure drop of 1 bar at an admission pressure of 6 bar in a certain direction through the flowmeter, can be increased. Thus, a flowmeter according to the invention is able to generate accurate measuring results and can easily be attached to a pipeline despite the arrangement of the ultrasonic transducers at the end surfaces of the measuring tube.

According to another feature of the present invention, the measuring tube is defined by an axis which may intersect a common axis defined jointly by the connection pipes and the pipeline. Suitably, the connection pipes may be respectively disposed laterally of the opposite ends of the measuring tube and distanced from one another by a length of the measuring tube.

According to another feature of the present invention, the axis of the measuring tube may intersect the common axis at an angle of about 30°.

According to another feature of the present invention, two adapter pipes may be disposed respectively between the measuring tube and the connection pipes, with the adapter pipes defining an axis which extends in perpendicular relationship to the axis of the measuring tube.

According to another feature of the present invention, fittings may be provided respectively at the connection pipes for easy attachment of the flowmeter to the pipeline. An example of a fitting is a union nut.

According to another feature of the present invention, the flowmeter may be configured point-symmetrically in relation to a point of intersection between the common axis of the connecting pipes and the axis of the measuring tube. Suitably, the flowmeter may be configured of two identical half portions which can be made through injection molding and connected to one another through welding by a welding seam, with the half portions being disposed in 180° rotated disposition relative to one another about the axis of the measuring tube. As a result, the flowmeter according to the present invention can be manufactured in a simple manner, whereby the symmetric configuration in particular saves working steps during production.

According to another feature of the present invention, the flowmeter has a housing which forms the measuring tube and the connecting pipes and can be made of plastic, e.g. PVDF, PFA, and PTFE. In some applications, it may be suitable to construct the housing of two parts comprised of an outer housing part and an inner housing part. The outer housing part may hereby be made of PVDF, and the inner housing part may be made of PFA.

According to another feature of the present invention, the connecting pipes may define inlet and outlet pipes. The ultrasonic transducers may be constructed as transmitter/receiver units. The ultrasonic transducers may include piezoelectric elements.

According to another feature of the present invention, fasteners may be provided for securement of the flowmeter.

According to another feature of the present invention, an electronic box with electronic operating and interface devices and/or electronic evaluation assembly may be provided on the flowmeter, with the flowmeter having electronic terminals for direct electric and mechanical connection of the flowmeter to the electronic box. As an alternative, the electronic box may also be located at a remote site to the flowmeter and connected to electronic terminals of the flowmeter via cables to establish the electric and mechanical connection between the flowmeter and the electronic box.

According to another feature of the present invention, the fluid may be a liquid, a gas, or a 2-phase medium.

A flowmeter according to the present invention has many advantages. The flow of fluid is routed between a pipeline and a connecting pipe with only minor changes in flow directions so that the Kv value can be increased in particular in the attachment zone to the pipeline. The disposition of the transducers at the end surfaces of the measuring tube produces accurate measurement of the flow velocity and flow rate of the fluid flowing in the pipeline. Installation of the flowmeter is simple and requires little space as a consequence of the flat construction of the flowmeter. Manufacture is also simple and cost-saving as a result of the symmetric configuration.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
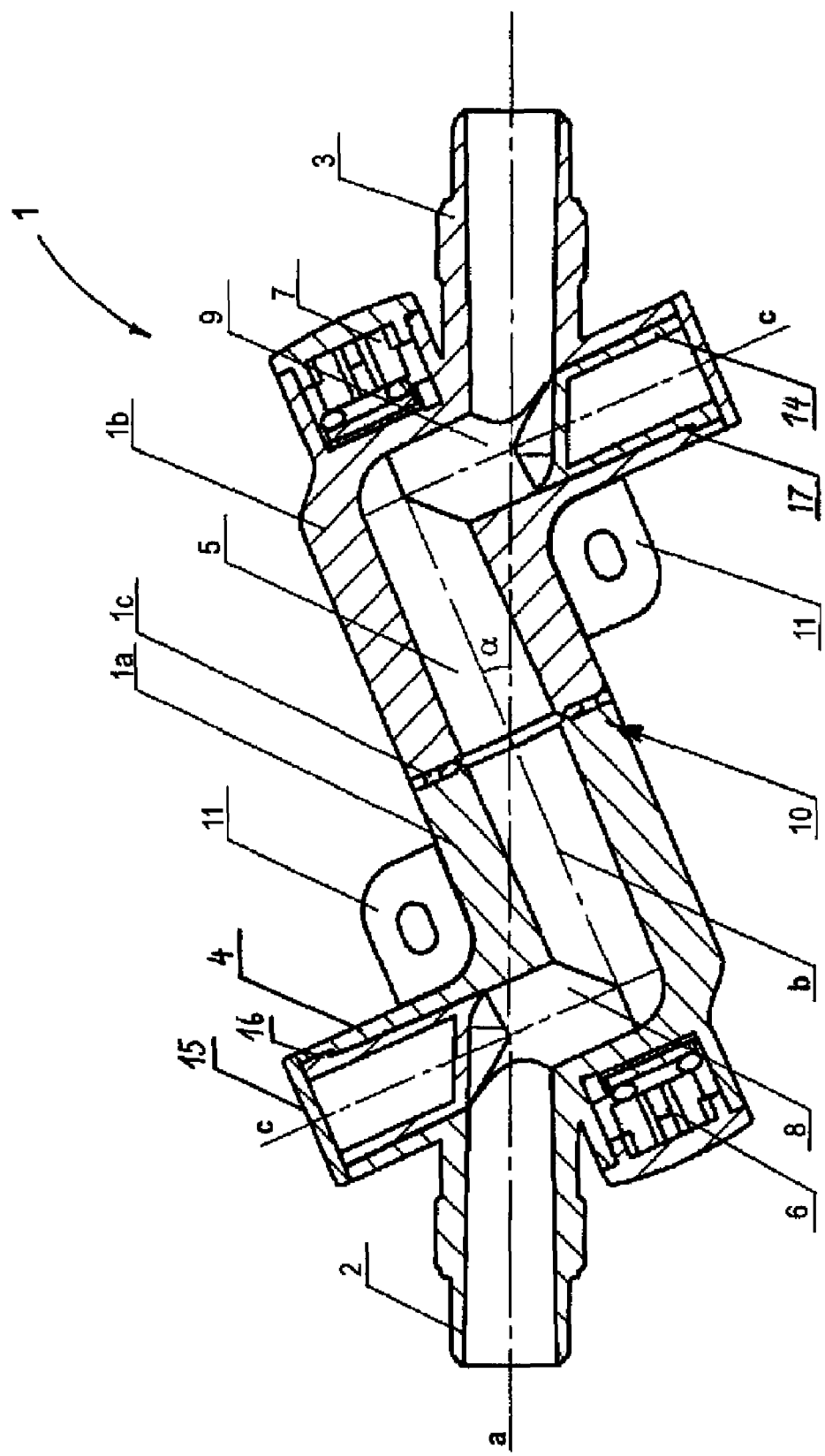
FIG. 1 is a longitudinal section of one embodiment of a flowmeter according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of one embodiment of a flowmeter according to the present invention, generally designated by reference numeral 1. The flowmeter 1 includes a housing, generally designated by reference numeral 10 and constructed to form a measuring tube 5 which is defined by an axis b. Disposed respectively at opposite ends of the housing 10 and thus of the measuring tube 5 are connecting pipes 2, 3 which define together an axis a which is coincidental with an axis of an unillustrated pipeline to which the flowmeter 1 is desirous to be attached. The connecting pipes 2, 3 are thus provided for attachment to the pipeline in which a fluid, such as a liquid, gas, or 2-phase medium flows, and whose flow velocity is being measured by the flowmeter 1. The connecting pipes 2, 3 represent hereby the inlet and outlet pipes. Attachment of the connecting pipes 2, 3 to the pipeline can be implemented in a simple manner by using fittings, such as, e.g. union nuts.

Arranged at one end surface of the measuring tube 5 is an ultrasonic transducer 6, and arranged on the other opposite end surface of the measuring tube 5 is an ultrasonic transducer 7. The disposition of the ultrasonic transducers 6, 7 at the end surfaces of the measuring tube 5 is beneficial because it allows precise measurement of the flow velocity. The ultrasonic transducers 6, 7 can hereby be constructed as transmitter/receiver units and may include piezoelectric elements.

As shown in FIG. 1, the axis b of the measuring tube 5 intersects the axis a of the connecting pipes 2, 3 and thus the axis of the pipeline at an angle $\alpha$, whereby the angle $\alpha$ may amount to 30°.

The flowmeter 1 further includes two adapter pipes 8, 9, whereby the adapter pipe 8 extends between the connecting pipe 2 and the measuring tube 5, and the adapter pipe 9 extends between the connecting pipe 3 and the measuring tube 5. The adapter pipes 8, 9 define each an axis c which extends perpendicular to the axis b of the measuring tube 5. The flow path of the fluid being measured in the flowmeter 1 may take place, for example, through the connecting pipe 2, the adapter pipe 8, the measuring tube 5, the adapter pipe 9, and the connecting pipe 3, and it can be seen from FIG. 1 that the flow path undergoes only minor directional changes.

As is further shown in FIG. 1, the flowmeter 1 is constructed point-symmetrical to the point of intersection between the axis a of the connecting pipes 2, 3 and the axis b of the measuring tube 5. Thus, the housing 10 of the flowmeter 1 can be made of two identical housing halves 1a, 1b which are connected together by a welding seam 1c.

The symmetric configuration of the housing 10 allows easy manufacture as the flowmeter 1 is composed of two identical parts that can be produced from plastic using an injection molding process. Mountings 4, used during injection molding, extend coaxially from the adapter pipes 8, 9 and can be sealed off by open-topped plugs 14 and lids 15. To prevent the plugs 14 from being pushed-in too deeply, the plugs 14 have a hooked portion 16 for engagement against a shoulder 17 inside of the mountings 4. The housing 10 may be made of any suitable material, in particular plastic, such as, e.g. PVDF (PolyVinylidine DiFluoride), PFA (PerFluorAlkoxy) and/or PTFE (PolyTetraFluorEthylen).

After production of the identical housing halves 1a, 1b, one of the housing halves 1a, 1b is rotated by 180° about the axis b with respect to the other one of the housing halves 1a, 1b, and then the two housing halves 1a, 1b are welded together along the welding seam 1c. The symmetric configuration enables simple and cost-efficient manufacture of the flowmeter 1.

The flowmeter 1 is further provided on the housing 10 or outside of the measuring tube 5 with fasteners 11 in the form of lugs with a hole for allowing fixation of the flowmeter 1 after being installed, i.e. attached to the pipeline. Of course, other types of fasteners to allow securement of the flowmeter may also be applicable.

Figure 2:
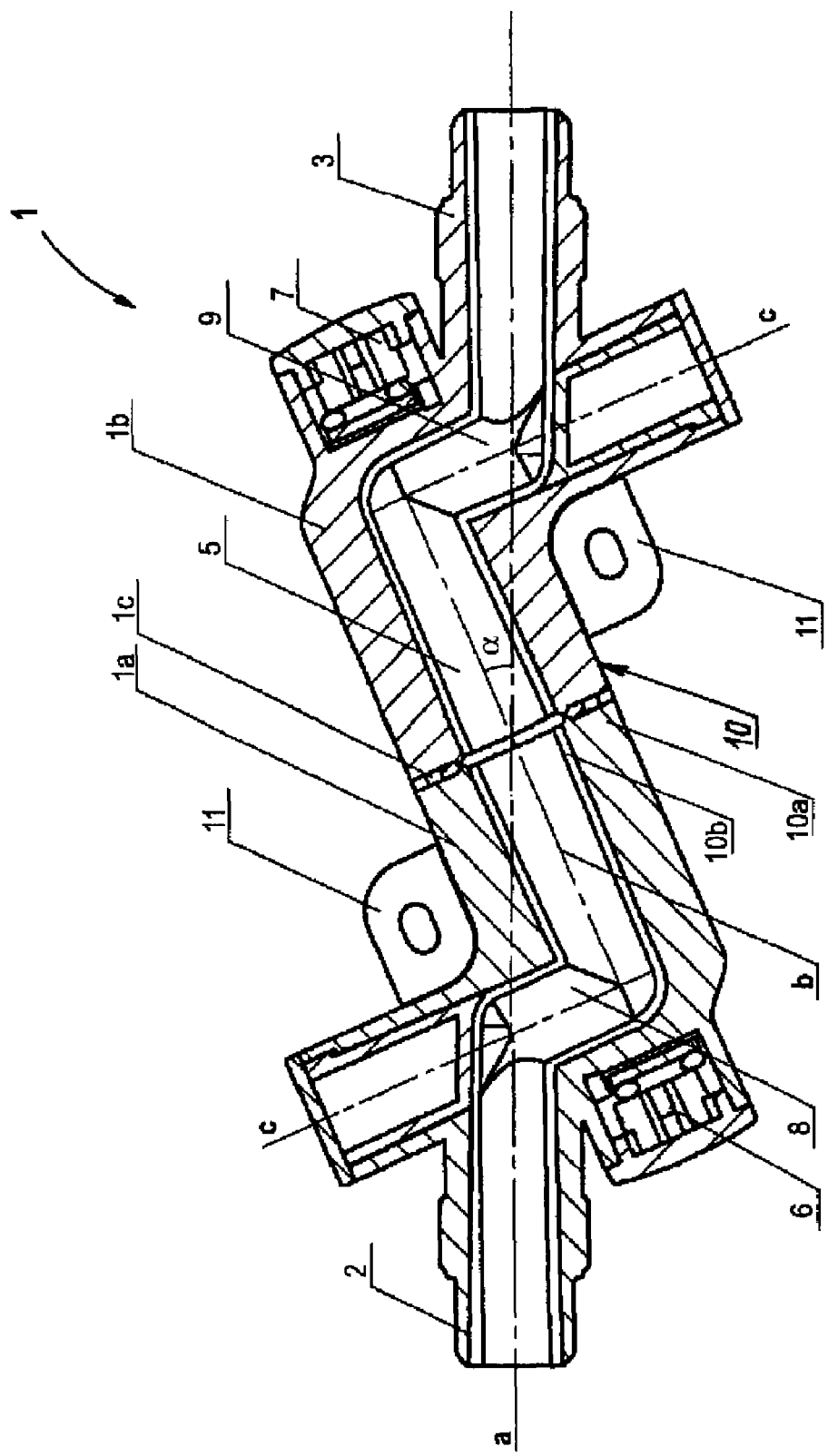
FIG. 2 is a longitudinal section of another embodiment of a flowmeter according to the present invention.

Referring now to FIG. 2, there is shown a longitudinal section of another embodiment of a flowmeter 1 according to the present invention. Parts corresponding with those in FIG. 1 are denoted by identical reference numerals and not explained again. The description below will center on the differences between the embodiments. In this embodiment, provision is made for a housing 10 whose housing halves 1a, 1b are each made of an outer housing part 10a and an inner housing part 10b. The outer housing part 10a may hereby be made of high-strength material, such as, e.g., a plastic material on polyvinylidine difluoride (PVDF) basis, whereas the inner housing part 10b may be made of high-purity and highly resistant material, such as, e.g., a plastic material on perfluoralkoxy (PFA) basis. The inner housing part 10b forms essentially a layer on the inner wall of the housing 10 to provide protection against chemically aggressive fluids that may flow through the flowmeter 1. The outer housing part 10a in surrounding relationship to the inner housing part 10b has the needed strength for support of the inner housing part 10b. The fasteners 11 for securement of the flowmeter 1 and the fittings such as union nuts for attachment of the flowmeter 1 to the pipeline are provided on the outer housing part 10a.

Production of the flowmeter 1 of FIG. 1 is carried out by first injection-molding the inner housing part 10b in a suitable mold (not shown) and then injection molding the outer housing part 10a upon the inner housing part 10b.

Figure 3:
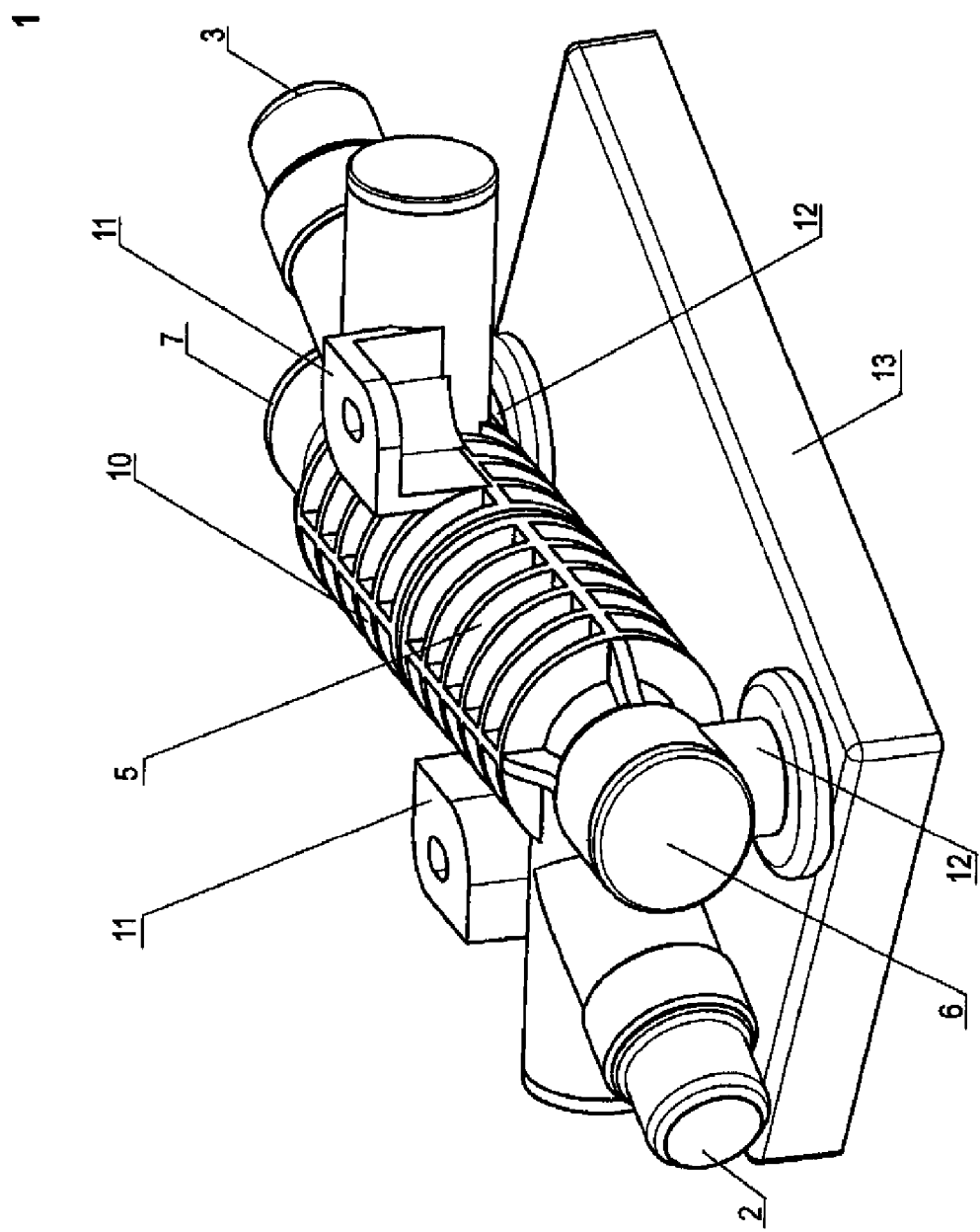
FIG. 3 is a top and side perspective view of a flowmeter according to the present invention in combination with an electronic box.

FIG. 3 shows a top and side perspective view of the flowmeter 1 in combination with an electronic box 13 with electronic operating and interface devices and/or electronic evaluation assembly. The electronic box 13 is hereby mechanically and electrically connected directly to the flowmeter 1 via electronic terminals 12 on the housing 10 of the flowmeter. Further depicted in FIG. 3 are the measuring tube 5, the terminal ultrasonic transducers 6, 7, the connecting pipes 2, 3 and the fasteners 11. Of course, the fasteners 11 may also be mounted to the electronic box 13.

Figure 4:
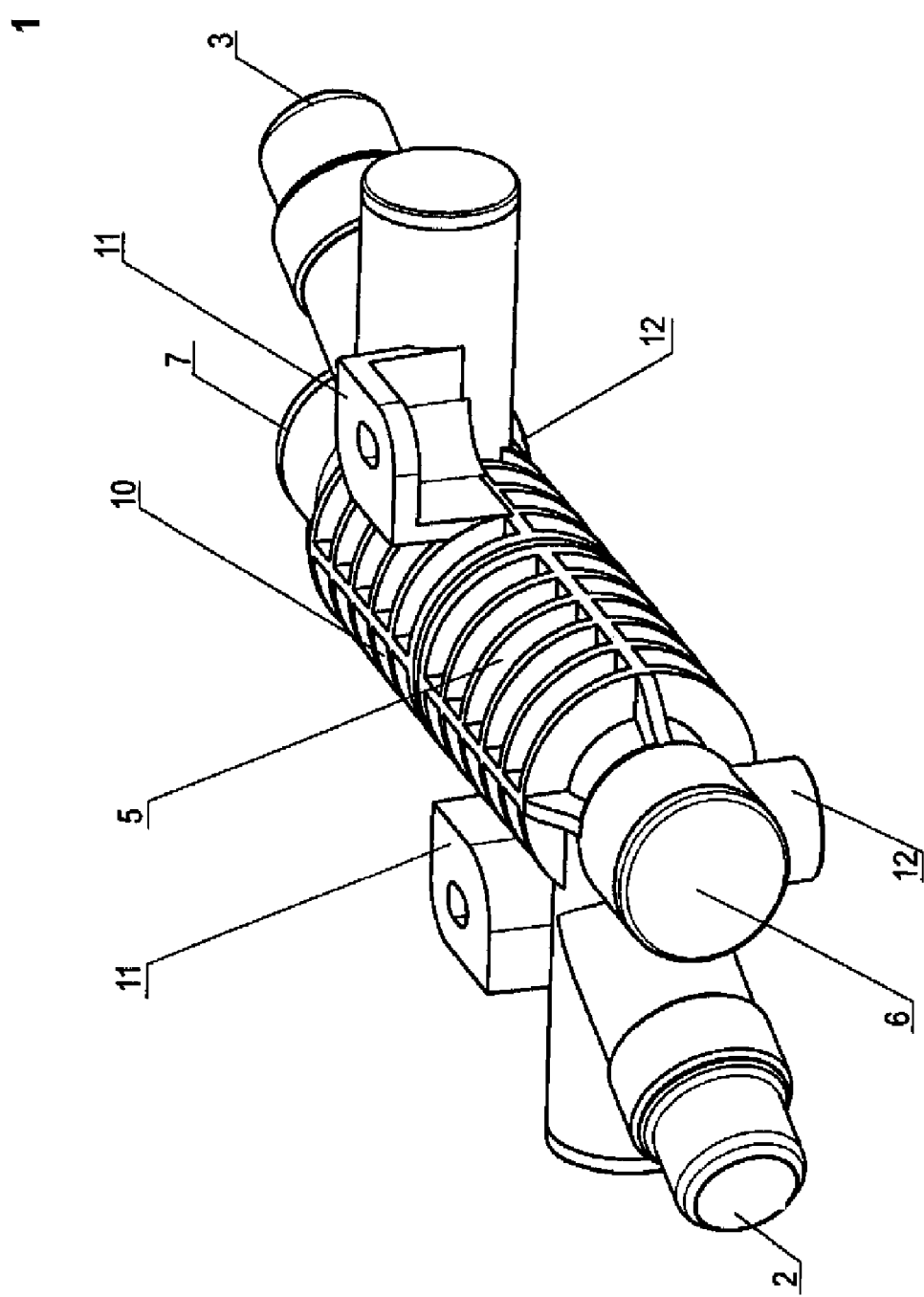
FIG. 4 is a top and side perspective view of a variation of a flowmeter according to the present invention.

FIG. 4 shows a top and side perspective view of the flowmeter 1 for connection to an unillustrated external electronic box. In this variation, the electronic terminals 12 are constructed as cable terminals for attachment of cables to connect the flowmeter 1 to the external electronic box.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A flowmeter for measuring a flow velocity of a fluid in a pipeline, comprising:
   a straight measuring tube having opposite ends and defined by an axis;
   two ultrasonic transducers disposed respectively at the opposing ends of the measuring tube; and
   two connection pipes provided for attachment of the flowmeter to the pipeline and extending in axial relationship to the pipeline,
   wherein the axis of the measuring tube intersects a common axis defined jointly by the connection pipes and the pipeline.

2. The flowmeter of claim 1, wherein the axis of the measuring tube intersects the common axis at an angle of about 30°.

3. The flowmeter of claim 1, further comprising two adapter pipes disposed respectively between the measuring tube and the connection pipes and defining an axis which extends in perpendicular relationship to the axis of the measuring tube.

4. The flowmeter of claim 1, constructed point-symmetrically in relation to a point of intersection between the common axis of the connecting pipes and the axis of the measuring tube.

5. The flowmeter of claim 1, made of two identical half portions made through injection molding and connected to one another through welding via a welding seam, with the half portions being disposed in 180° rotated disposition relative to one another about the axis of the measuring tube.

6. The flowmeter of claim 1, wherein one of the connection pipes is disposed laterally of one of the opposite ends of the measuring tube and the other one of the connection pipes is disposed laterally of the other one of the opposite ends of the measuring tube, wherein the connection pipes are distanced from one another by a length of the measuring tube.

7. The flowmeter of claim 1, further comprising fittings respectively provided at the connection pipes for attachment of the flowmeter to the pipeline.

8. The flowmeter of claim 1, further comprising a housing forming the measuring tube and the connecting pipes and constructed to receive the ultrasonic transducers.

9. The flowmeter of claim 8, wherein the housing is made of plastic.

10. The flowmeter of claim 8, wherein the housing is made of at least one plastic material selected from the group consisting of PVDF, PFA, and PTFE.

11. The flowmeter of claim 8, wherein the housing is made of an outer housing part and an inner housing part.

12. The flowmeter of claim 11, wherein the outer housing pad is made of PVDF.

13. The flowmeter of claim 11, wherein the inner housing part is made of PFA.

14. The flowmeter of claim 1, wherein the connecting pipes define inlet and outlet pipes.

15. The flowmeter of claim 1, wherein the ultrasonic transducers are constructed as transmitter/receiver units.

16. The flowmeter of claim 1, wherein the ultrasonic transducers includes piezoelectric elements.

17. The flowmeter of claim 1, further comprising fastening means for securement of the flowmeter.

18. The flowmeter of claim 1, further comprising an electronic box with electronic operating and interface devices and/or electronic evaluation assembly, said flowmeter having electronic terminals for electric and mechanical connection of the flowmeter to the electronic box.

19. The flowmeter of claim 1, further comprising an electronic box with electronic operating and interface devices and/or electronic evaluation assembly at a remote location to the flowmeter, said flowmeter having electronic terminals for attachment of cables for electric and mechanical connection of the flowmeter to the remote electronic box.

20. The flowmeter of claim 1, wherein the fluid is a liquid, gas, or 2-phase medium.

21. The flowmeter of claim 1, constructed in flat configuration.

* * * * *